May 10, 1932. J. F. REID 1,857,331
CURB METER
Filed Sept. 22, 1926 2 Sheets-Sheet 2

INVENTOR
James F. Reid
BY Green & McCallister
His ATTORNEYS

Patented May 10, 1932

1,857,331

UNITED STATES PATENT OFFICE

JAMES F. REID, OF PITTSBURGH, PENNSYLVANIA, ASSIGNOR, BY MESNE ASSIGNMENTS, TO PITTSBURGH EQUITABLE METER COMPANY, OF PITTSBURGH, PENNSYLVANIA, A CORPORATION OF PENNSYLVANIA

CURB METER

Application filed September 22, 1926. Serial No. 137,016.

This invention relates to meters and more particularly to gas meters used for measuring the consumption of gas in an associated building.

In many cases it has been found more practical to locate gas meters along the street curb than to place them in the building and this is done in housings or so called curb boxes set in the ground with the tops flush with the surface thereof.

An object of this invention is to provide a meter having an improved construction and arrangement of such form that it is particularly adapted for installation in curb boxes.

A further object is to provide a meter of the type set forth of such construction and arrangement that it can be easily and quickly removed from or placed in a curb box or housing without the necessity of straining or springing the gas inlet and outlet pipes associated with the housing.

A still further object is to provide a gas meter in which the register box glass can be easily and quickly removed for cleaning or repairs without affecting the gas connections or the operation of the meter.

In time of storm it sometimes happens that the boxes become flooded and remain so for some time and a further object is to provide a meter of the type set forth having a water proof construction which will not be affected by such flooding of the curb box.

A still further object is to provide a gas meter of such construction and arrangement that various sections may be removed for access to certain operating parts without destructing the remainder of the assembly.

A still further object is to provide a device of the type set forth which is simple in construction, easy to manufacture and effective and reliable in operation.

Figure 1:
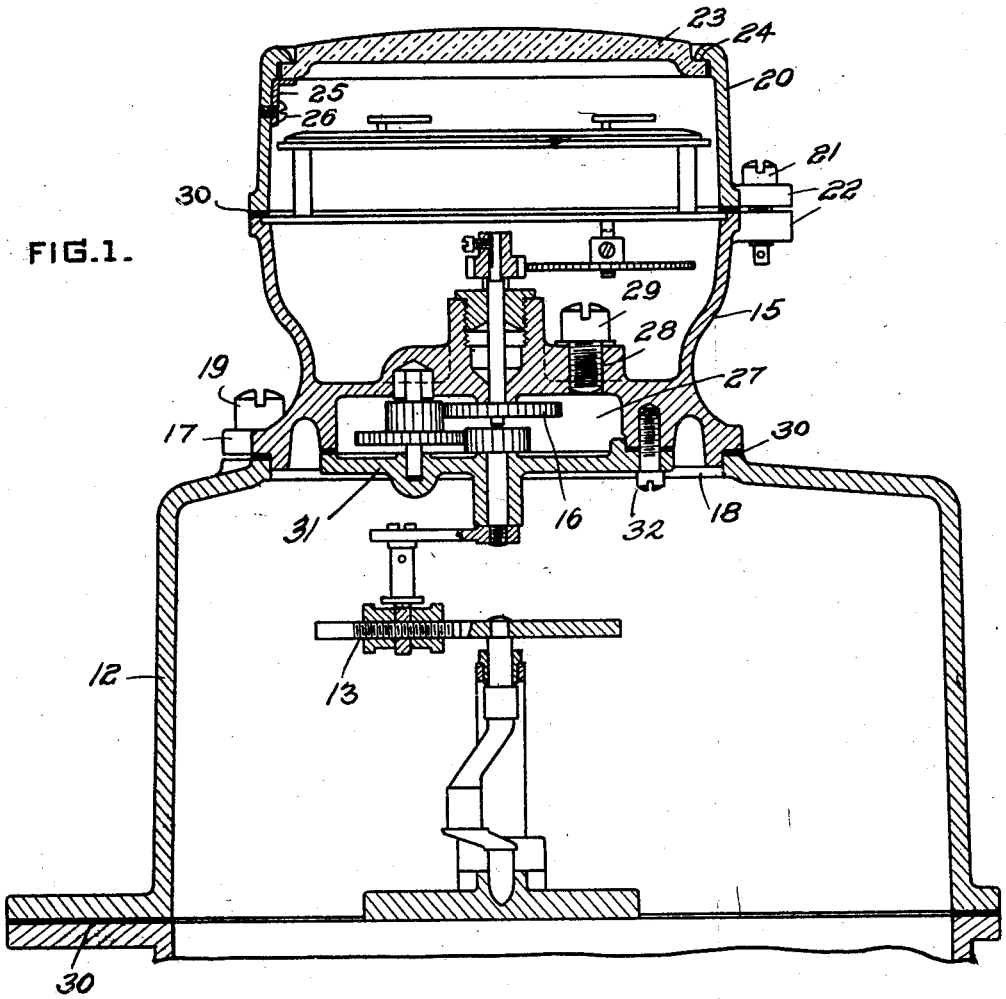
Figure 2:
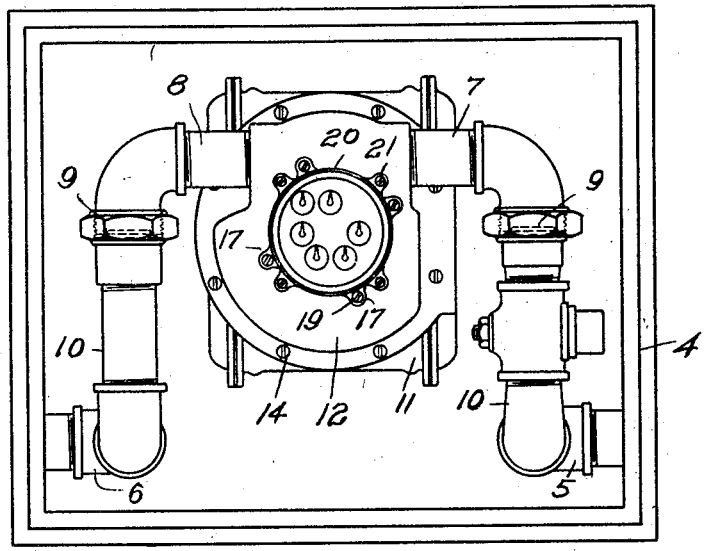
Figure 3:
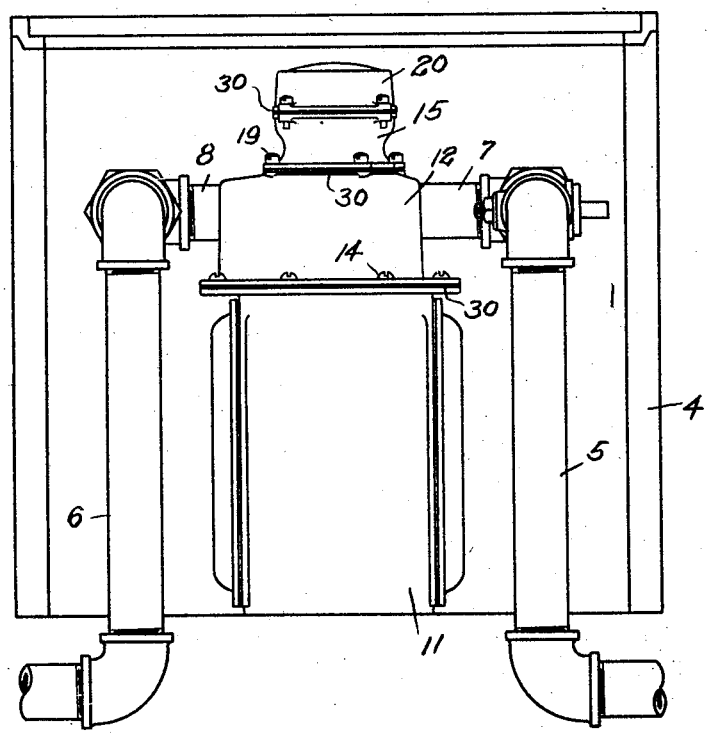

These and other objects which will be apparent to those skilled in this particular art are accomplished by means of the invention illustrated in the accompanying drawings, in which Figure 1 is a transverse sectional view of a portion of a gas meter illustrating one embodiment of this invention;

Fig. 2 is a top plan view thereof showing the meter positioned in a curb box or housing; and Fig. 3 is a side elevation of the arrangement illustrated in Fig. 2 showing the curb box in section.

The particular embodiment of this invention which has been chosen for the purposes of illustration is shown in the drawings as located in a curb box or housing which is positioned outside of an associated building so that the meter reader is not required to enter the building to read the meter but can do so by merely raising the cover of the housing. For this reason the register box of the meter is so arranged that the registering dials can be seen through a glass located in the top of the box. The meter is so connected to the gas inlet and outlet pipes that it can be disconnected therefrom and removed from the curb box without springing such pipes apart or in any way straining them to make room for such removal. The meter includes a casing for the distributing chamber which is secured to the meter body by fastening means accessible from the top of the curb box. In the same way the gear housing is secured to the meter casing by means accessible from the top of the curb box and the register box is likewise fastened to the top of the gear housing by means of fastening elements which are also accessible from the top of the curb box. In this way the casing of the distributing chamber, the gear housing and the register box can be removed either as a unit without disturbing the meter proper and the connecting lines, or the register box and gear housing can be removed together without disturbing the distributing chamber and associated mechanism or the register box only can be removed for the purpose of replacing the glass or for cleaning the same. The joints between the several parts are provided with suitable gaskets for rendering the meter water proof.

As illustrated, a curb box or housing 4 is provided with a valve controlled gas inlet pipe 5 and a gas outlet pipe 6 leading to the associated building. The inlet and outlet pipes are so positioned that the meter proper can be removed from or placed in the box 4 without affecting the position of the pipes and without spreading them apart to permit such removal. The inlet and outlet connections 7 and 8, respectively, of the meter are connected to the associated inlet and outlet pipes 5 and 6 by unions 9 connected to horizontal sections 10 of the respective pipes. By connecting the meter to horizontal sections 10 through the medium of the unions 9, it will be apparent that breaking the connections formed by the unions will permit the meter to be lifted from the housing 4 without the necessity of springing the associated pipes apart to provide room for such removal as has heretofore been necessary.

The meter 11 is provided with a casing 12 enclosing the distributing chamber within which is the usual tangent 13, and the casing 12 is secured to the meter by fastening means such as screws 14 easily accessible from the top of the curb box as shown in Figs. 2 and 3. A gear housing 15 enclosing the reducing gears 16 is provided with ears 17 for securing the gear housing to the casing 12 above an opening 18 provided in the top thereof. Fastening means such as screws 19 are associated with the ears for securing the gear housing in position on the top of the casing 12 and a register box 20 is mounted on the top of the gear housing and secured thereto by means of screws 21 cooperating with screw receiving ears 22 formed around the top of the gear housing and the bottom of the register box. In order to provide a water proof construction which will be uninjured by flooding of the curb box the respective joints between the casing and meter body, the casing and gear housing and the gear housing and register box are provided with impervious gaskets 30.

The top of the register box is closed by a glass 23 clamped in position against an annular shoulder 24 formed around the top of the box by means of glass holding clips 25 suitably positioned and held in place by screws 26. The glass will also be cemented in place as is customary.

The register mechanism enclosed in the box 20 can readily be seen from the top of the meter through the protecting glass 23 so that the meter can be read merely by opening the associated housing or curb box 4. If the glass is fogged, it is only necessary to unfasten the screws 21 to remove the register box 20 for the purpose of cleaning the glass, and it will be apparent that such an operation in no way interferes with the operation of the meter proper. If it is necessary to replace the glass 23 with a new piece, this can be quickly accomplished because the holding clips 25 are readily removed and readjusted, which will faciltate the cementing operation.

A lubricating chamber 27 is formed in the gear housing 15 for the reducing gears 16, and a closure plate 31 is clamped in position by screws 32 for holding lubricant therein. This chamber can be filled with lubricant through an opening 28 normally closed by a screw plug 29. Access to the plug 29, for the purpose of filling the lubricant chamber, is easily and quickly obtained by unfastening the screws 21 and removing the registering box without affecting the meter and register connections.

It will be apparent that access to the tangent 13 for adjustment purposes may be had by merely unfastening the screws 19 and removing the register box and gear housing together as a unit and that this operation can be accomplished without removing the meter proper from the curb box. Likewise the casing 12 of the distributing chamber can be removed as a unit with the gear housing and register box if necessary so that access to the interiors of any of these separate parts may be had by loosening one joint only, due to the fact that all or a portion of these separable parts can be handled as a unit.

What I claim as new and desire to secure by Letters Patent is:

1. The combination in a gas meter, of a gear housing having a lubricant chamber formed therein, there being an opening within said gear housing communicating with said chamber, a plug for said opening, and a register box mounted on said gear housing and removable therefrom for giving access to said plug.

2. The combination in a gas meter adapted to be housed in a curb box, of a meter body, a casing secured to the meter body, means for securing said casing to said body, a gear housing mounted on said casing, means accessible from the top of said box for securing said housing to said casing, a register box mounted on said housing, means accessible from the top of said curb box for securing said register box to said housing, gas inlet and outlet pipes associated with said curb box, and connections between said meter and said pipe including detachable sections disposed at right angles to said inlet and outlet pipes and said connections so arranged as to permit the meter to be passed between said pipes when disconnected therefrom.

3. The combination in a gas meter of a casing, a gear housing mounted on said casing, a register box mounted on said housing, means accessible from the top for securing said box to said housing and said housing to said casing so as to render said box and casing removable singly or together, walls defining a lubricant chamber formed within said gear housing, there being an opening within said gear housing communicating with said chamber and a register box mounted on said gear housing and removable therefrom for giving access to the opening.

4. The combination in a gas meter adapted to be housed in a curb box, of a meter body, a casing securable to the meter body, means accessible from the top of said box for securing said housing to said body, a gear housing mounted on said casing, means accessible from the top of said box for securing said housing to said casing, a register box mounted on said housing, means accessible from the top of said box for securing said register to said housing, walls defining a lubricant chamber formed within said gear housing, there being an opening within said gear housing communicating with said chamber, a register box mounted on said gear housing and removable therefrom for giving access to said opening.

5. In combination with a meter curb box opening in one direction, a meter within said box, said meter comprising a meter body, a distributing casing secured to said body, a gear housing, fastening devices readily operable and removable through said opening for attaching said housing to said casing, a register box, fastening devices readily operable and removable through said opening for attaching said register box to said gear housing, inlet and outlet pipes in said curb box and detachable means connecting said pipes to said meter allowing removal of said meter through said opening without relative movement of said pipes, the said gear housing including a lubricant chamber provided with a supply port having a closure readily removable from said opening after said register box has been removed.

6. The combination in a gas meter of a meter body, a casing mounted on said body, a gear housing mounted on said casing, a register mounted on said housing, means for securing said elements together so as to render them removable from said meter separately or as a unit, a curb box housing for said meter body, gas inlet and outlet pipes extending upwardly from said curb box housing, a horizontal section associated with each of said pipes, inlet and outlet connections on said meter disposed approximately at right angles to said horizontal sections, and means for joining said connections to said horizontal sections in a manner to permit disconnection of said meter, without causing relative separation of said upwardly extending pipes.

7. The combination in a gas meter adapted to be housed in a curb box, of a meter body, a casing securable to the meter body, means for securing said casing to said body accessible from the top of said box, a gear housing mounted on said casing, means accessible from the top of said box for securing said housing to said casing, a register box mounted on said housing, means accessible from the top of said curb box for securing said register box to said housing, gas inlet pipes extending upwardly from the bottom of said curb box, a horizontal section associated with each of said pipes, inlet and outlet connections on said meter disposed approximately at right angles to said horizontal sections, and means for joining said connections to said horizontal sections in a manner to permit disconnection of said meter without causing relative separation of said upwardly extending pipes.

In testimony whereof, I have hereunto subscribed my name this 20th day of September, 1926.

JAMES F. REID.